No. 649,559.  
F. A. WELLS.  
SEEDING PLOW.  
(Application filed Feb. 8, 1900.)  
Patented May 15, 1900.
(No Model.)
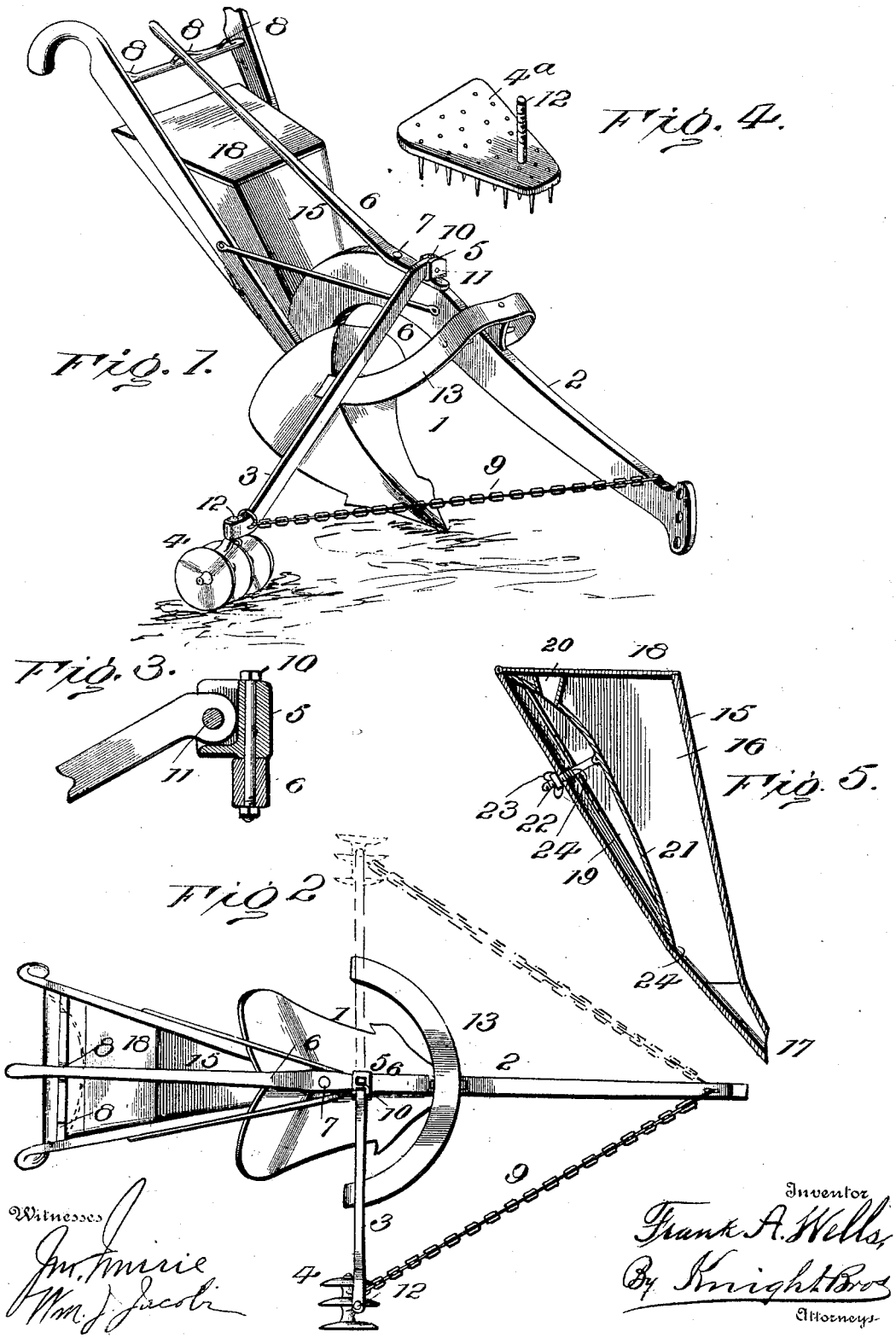

UNITED STATES PATENT OFFICE.

FRANK A. WELLS, OF FLORENCE, KANSAS.

SEEDING-PLOW.

SPECIFICATION forming part of Letters Patent No. 649,559, dated May 15, 1900.

Application filed February 8, 1900. Serial No. 4,531. (No model.)

*To all whom it may concern:*

Be it known that I, FRANK A. WELLS, a citizen of the United States, and a resident of Florence, Marion county, Kansas, have invented certain new and useful Improvements in Seeding-Listers, of which the following is a specification.

My invention relates to an implement for seeding corn or other grain, and has for its objects, first, to provide means whereby the packing of the soil over the grain by the tread of the draft-animal is overcome, and, second, to provide an improved seedbox which will avoid leaving unfinished or partially-seeded rows.

When the soil is packed or hardened by the tread of the draft-animal over a grain and the earth thereafter becomes baked, the grain is either entirely prevented from putting its shoot through the surface or is so retarded as to put it far behind the growth of the other plants and eventually make an uneven crop. If, however, means is provided for loosening or stirring the soil upon which a draft-animal treads, these ill effects will be entirely overcome. It frequently happens in planting corn, and especially where three horses are used, that one horse walks in the line of a previously-planted row. One feature of my invention has reference to providing a seeding-plow with a laterally-projecting harrow or breaker which may be made to follow in the tracks of the draft-animals walking upon a planted row and stir up the ground trodden down. The harrow or stirrer is preferably mounted upon a laterally-projecting arm hinged to the plow-beam to permit the vertical-swinging movement and also horizontal-swinging movement, so that the stirrer may not only conform to unevenness in the surface, but may swing from one side to the other of the plow-beam, so as to be kept upon the side of the plowed ground in back-and-forth plowing, a flexible connection extending from the arm toward the forward end of the beam for maintaining the arm in proper position on either side. The arm is connected to the beam through the medium of a lever extending within reach near the plow-handles and laterally movable for changing the reach of the arm from the plow. This part of my invention also embodies other features of novelty to be hereinafter fully described.

It frequently happens that through carelessness the supply of seed in the seedbox will become exhausted at a point distant from the grain-bag, and irresponsible employees will finish out a row with the seedbox running empty and until the supply of grain is reached. To obviate this difficulty, I provide a seedbox of ordinary construction with a movable partition therein, forming the wall of an auxiliary receptacle normally cut off from communication with the main seedbox, but readily connected therewith at will, and of sufficient capacity to supply a row or rows sufficient to carry the seeding temporarily until the supply is reached. By this means after the supply of grain has run out the operator may open up the auxiliary box, which will carry him through the row on which he is working and a return row, if necessary, until a point is reached near the grain-supply. The running out of the grain in the main box will have apprised him of the exhausting of the supply, and he will be enabled by the auxiliary supply to continue to a point where he may conveniently fill the grain-receptacles again.

In the accompanying drawings, Figure 1 is a perspective view of a lister-plow having the features of my invention applied thereto. Fig. 2 is a plan view of the same. Fig. 3 is a detail view of the double swinging joint by which the stirrer-arm is connected to the adjusting-lever. Fig. 4 is a perspective view of a modified form of stirrer that may be substituted for the rotary disks illustrated in Figs. 1 and 2. Fig. 5 is a vertical longitudinal section of the seedbox.

1 represents a lister or seeding plow, to the rear portion of the beam 2 of which is connected a laterally-projecting arm 3, which carries at its outer end a stirrer or harrow 4 of any suitable construction. The arm 3 is designed to retain the stirrer 4 off from the beam about the distance of a row-space, so that the stirrer will follow in the tracks of the draft-animal if the latter walks in the line of a row of planted grain and pulverize or stir up the soil trodden upon by the animal. To permit of regulating the lateral offset of the stirrer from the plow, the inner end of the arm 3 is connected to the beam 2 through the medium of a lever 6, to which said arm is connected through the medium of a horizontally and vertically hinging joint 5. Said lever 6 is fulcrumed at 7 upon the plow-beam and extends rearwardly to a point between the plow-handle, where it rests in one or another of the three or more seats 8. By adjusting the lever 6 from side to side the offset of the stirrer may be shifted, and the position to which it is thus adjusted will be maintained by the seat or notch in which the lever is held by its own elasticity.

9 represents a flexible connection extending from the forward end of the beam to the arm 3, so as to draw the stirrer. This connection is such that the arm 3 may be shifted to either side of the beam without impairing the function of said flexible connection. This shifting of the stirrer is accomplished by simply tilting the plow and permitting the arm to swing by gravity. To raise the arm in a swinging movement and permit the stirrer 4 to clear the beam, I provide a track 13, which curves upwardly from the points beneath the normal position of the arm on either side of the beam to a point above the beam, so that as the arm 3 swings it will rise over the beam. The horizontal swinging of the arm takes place upon the bolt 10, Fig. 3, and its vertical swinging upon the bolt 11.

The stirrer is preferably in the form of three disks, though it may be of a greater or less number of disks or in the form of a toothed harrow (shown in Fig. 4 at 4ª) and having a vertical post 12, by which it is swiveled to the arm 3.

The improved form of seedbox is illustrated more clearly in Fig. 5. 15 represents the box constructed with a main compartment 16, which discharges at 17 in the usual way, and having a cover 18, through which it may be supplied. It is intended that the spout 17 shall be provided with a suitable means for controlling the passage of grain through it, so that grain may be dropped at will in the well-known manner. 19 represents an auxiliary compartment which is normally cut off from the main compartment 16 and which may be charged through an opening 20. This auxiliary compartment is preferably formed by a movable partition 21, extending between the side walls of the box and held normally in contact with the rear wall by a bolt 22 and nut 23, but forced away from the rear wall by a spring 24 upon loosening the nut 23 so as to open the receptacle at 24 and permit escape of the contents of the auxiliary receptacle into the main receptacle when desired.

Ordinarily the receptacle 16 will be kept supplied with grain if reasonable care is observed; but should the supply run out at a point distant from the place of recharging the thumb-nut 23 is loosened and the contents of the auxiliary receptacle 19 will supply grain until the point of recharging is reached, whereupon both receptacles will be again filled and the nut 23 tightened up to keep the reserve supply for emergency.

While I have described my improvements as applied to a walking implement, it is obvious that both of the improvements are applicable as well to a riding implement.

Having thus described my invention, the following is what I claim as new therein and desire to secure by Letters Patent:

1. In combination with a seeding implement, an arm extending laterally from said implement, a vertical pivot through which the inner end of the arm is connected to the beam of the implement and upon which said arm swings horizontally forward and over the beam of the implement, and a harrow or stirrer carried by said arm, for the purpose set forth.

2. In combination with a seeding implement, an arm projecting laterally from the beam of said implement and carrying at its outer end a harrow or stirrer, and a connection between the inner end of said arm and the beam of the implement, embodying a horizontal pivot upon which the arm yields vertically, and a vertical pivot upon which the arm swings horizontally forward and over the beam to the opposite side of the implement; substantially as herein explained.

3. In combination with a seeding implement, an arm connected thereto by means which permits it to swing to either side of the implement, a harrow or stirrer carried by said arm and a track upon which said arm slides in shifting its position and by which it is made to clear the implement in passing over, substantially as set forth.

4. In combination with a seeding implement, an arm carrying a harrow or stirrer and connected with the implement through the medium of the horizontal axis 11 and the vertical axis 10 above the beam, whereby the arm yields vertically to unevenness in the ground and may reverse from side to side of the implement by swinging horizontally, substantially as and for the purposes set forth.

5. In combination with a seeding implement, an arm extending laterally from said implement and carrying a stirrer or harrow at its outer end, a connection between the inner end of said arm and the beam of the implement, embodying a vertical pivot upon which the arm swings horizontally forward and over the beam in a plane substantially parallel to the beam, and a flexible draft connection from the outer end of the arm to the forward end of the beam, reversible on said arm and beam; substantially in the manner and for the purpose set forth.

6. In combination with a seeding implement, an arm extending laterally therefrom, and carrying at its end means for affecting the soil and a lever through the medium of which the arm is connected to the implement and by the shifting of which the arm is adjusted in its lateral offset, as explained.

7. In combination with a seeding implement, the laterally-projecting arm 3 carrying the soil-stirrer and the lever 6 fulcrumed at 7, providing means for connecting said arm with the implement and extending within reach from the handles and there provided with means for retaining its lateral adjustment.

8. In combination with a seedbox of a seeding implement, a partition extending between two opposite sides of the seedbox and inclining toward a third side to provide with said sides an auxiliary seed-receptacle normally cut off from communication with the seedbox, and means for moving said partition away from the third side at bottom to open communication between the two receptacles; substantially as set forth.

9. In combination with the seedbox, a vertical partition or wall in said seedbox inclining to one side of the latter and dividing the said box into two compartments, and means for movably holding the lower end of said partition or wall into contact with the side of the seedbox and for removing it therefrom to open communication between the two compartments; substantially as herein set forth.

10. In combination with a seedbox, the movable wall, a bolt by which said wall is held in position to close communication between the compartments and a spring for moving the wall to open communication between the compartments when the bolt is released, substantially as set forth.

11. In combination with a seeding implement, a seedbox mounted thereon, a partition movably mounted in said seedbox, cutting off a portion of said box to provide an auxiliary seed-receptacle, and extending to one of the sides at its bottom, to close communication between the receptacle, a bolt for securing said partition in place, and a spring between said partition and an opposite side for separating them when the bolt is loosened, as explained.

FRANK A. WELLS.

Witnesses:
　EDWIN S. CLARKSON,
　KATHERINE E. MANNING.